No. 817,811. PATENTED APR. 17, 1906.
P. W. SIEURIN.
AUTOMATIC COLLECTING AND HOISTING OF GOODS.
APPLICATION FILED APR. 6, 1904.

2 SHEETS—SHEET 2.

Witnesses
L. Waldman
C. Heymann

Inventor:
Paul Wilhelm Sieurin
by P. Singer.
Attorney

UNITED STATES PATENT OFFICE.

PAUL WILHELM SIEURIN, OF GOTHENBURG, SWEDEN.

AUTOMATIC COLLECTING AND HOISTING OF GOODS.

No. 817,811.  Specification of Letters Patent.  Patented April 17, 1906.

Application filed April 6, 1904. Serial No. 201,909.

*To all whom it may concern:*

Be it known that I, PAUL WILHELM SIEURIN, sea-captain, a subject of the King of Sweden and Norway, residing at Gothenburg, Sweden, (whose post-office address is 51 Linnégatan, Gothenburg, Sweden,) have invented certain new and useful Improvements in Arrangements for Automatic Collecting and Hoisting Up of Goods; and I do declare the following to be a full, clear, and exact description of the invention, such as will enable others skilled in the art to which it appertains to make and use the same.

This application relates to an apparatus for collecting and hoisting goods or material, particularly from the hold of a vessel. Its objects are to provide an apparatus whereby coal, grain, or other material may be rapidly gathered and delivered from the hold of a vessel.

It consists in the apparatus and combinations which will be disclosed hereinafter and which is shown in the accompanying drawings, in which—

Figure 1:
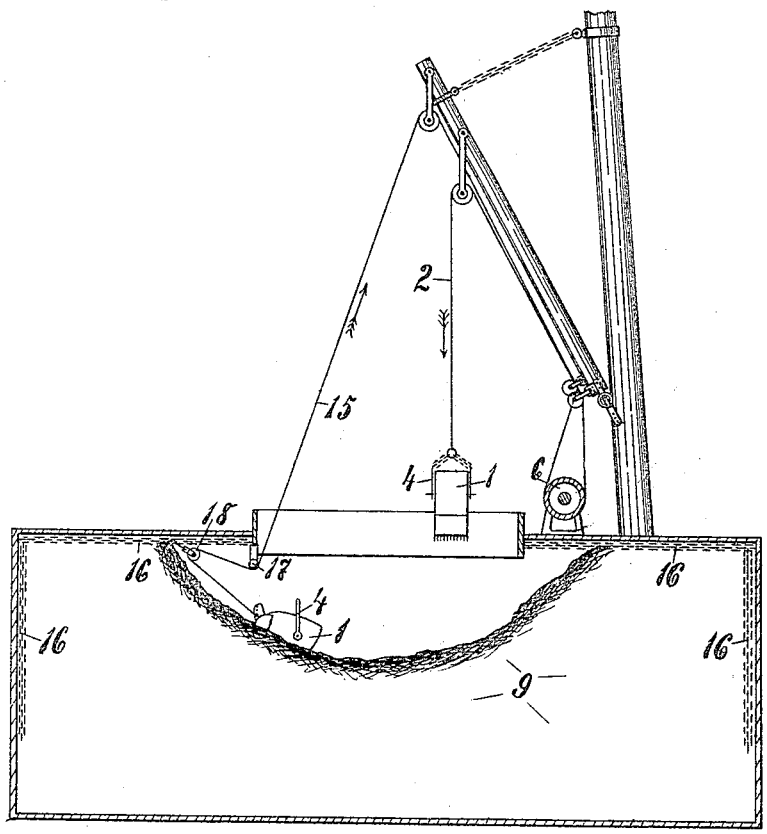
Figure 2:
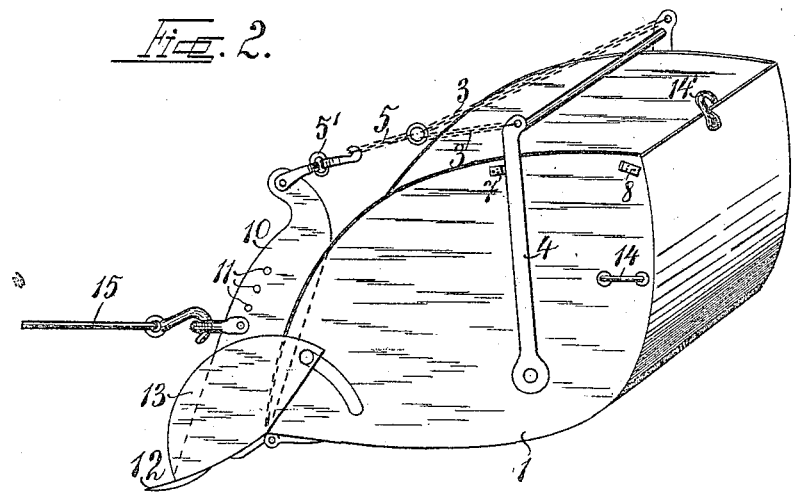
Figure 3:
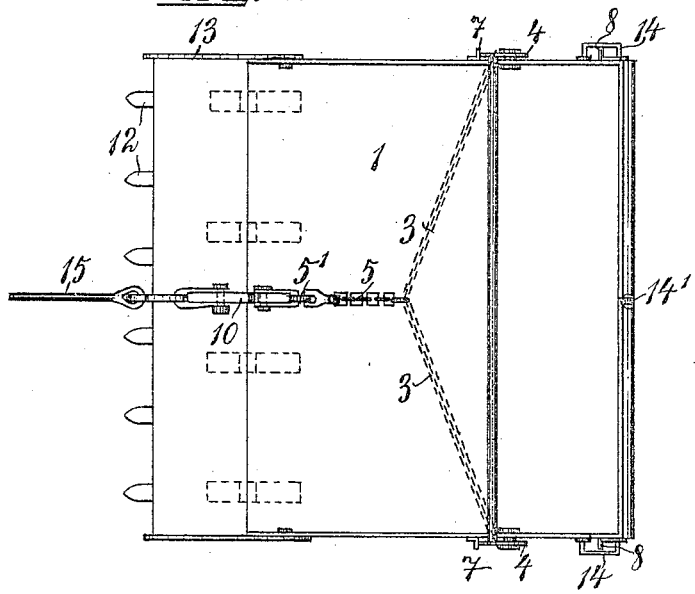

Figure 1 is a sectional view showing the hold of a boat or vessel with my improved apparatus in operative position. Fig. 2 is a perspective view of the bucket or scoop used for collecting and lifting the material, and Fig. 3 is a top plan view of the same.

As shown in Fig. 1, the chains for the attachment of the cable-guiding sheave are carried from the edge of the ceiling of the opening along the inside of the ceiling of the hold and thence down along the walls of the same. By means of this arrangement it is possible to obtain anchorages for the draft-line 15 at remote points in the hold 9 in order that the scoop may reach all parts of the hold. The draft-line 15 is guided at the entrance to the hold by means of a block 17 and from thence passes to a guide sheave or block 18 and down to the scoop 1. The scoop is raised by means of a hoist-line 2, said hoist and draft lines being operated by means of suitable drums, (represented at 6.)

The scoop 1 is preferably made substantially as shown in the drawings, and the bail is provided with limiting-stops 7 and 8. The bail 4 is connected with a ring by means of two chains 3, and this ring is in turn connected with an arm 10 by means of a chain 5. This arm extends up from a pivoted edge or extension 12 of the scoop. This extension is adapted to close up to hold the material in the scoop. The draft-line 15 engages with the arm 10 by means of a hook or the like and a clevis, which is adapted to engage with one of several holes 11 in the arm, thereby allowing the scoop to be drawn at a greater or less angle into the material. After the scoop has been filled the draft-line 15 is uncoupled and the hoist-line 2 is coupled with the ring connecting the chains 3 and 5. When the hoist-line is tightened, the arm 10 causes the extension 12 to be turned upward to form a wall at the mouth of the scoop.

Having thus described my invention, what I claim, and desire to secure by Letters Patent, is—

1. In a collecting and hoisting apparatus for taking material from the hold of a vessel, the combination of chains 16 secured along the ceiling of the hold and along its walls or equivalent fastening devices, and a hoisting-bucket provided with a drag-cable, and blocks secured to said chain for guiding said cable, substantially as described.

2. In a gathering and hoisting bucket, the combination with the bucket proper, of a hinged front edge 12 which is adapted to be swung up to form a closing-wall, a bail for said bucket, and lifting-chains secured to said bail and connected with said front edge, whereby the latter will be swung up when the bucket is raised.

3. The combination with a hoisting-bucket, of a movable edge 12, arms 10, extending up from said edge, lifting-chains secured to said arms, said arms being provided with a plurality of holes whereby a chain may be adjustably secured thereto so that the front edge may be presented to the material at a more or less acute angle.

In testimony whereof I affix my signature in presence of two witnesses.

PAUL WILHELM SIEURIN.

Witnesses:
 TUITIOF GEREON LINDGREN,
 ERNST NARDLINDH.